3,017,366
ELECTROLUMINESCENT PHOSPHOR AND TREATMENT
Ralph M. Potter, Cleveland Heights, and Manuel Aven, Lyndhurst, Ohio, assignors to General Electric Company, a corporation of New York
Filed Jan. 5, 1959, Ser. No. 784,940
7 Claims. (Cl. 252—301.6)

This invention relates to electroluminescent phosphors, that is to phosphors responsive to electric field excitation, and is more particularly concerned with a method of treating electroluminescent phosphors to improve their maintenance of brightness.

Electroluminescent phosphors are used in electroluminescent lamps comprising a thin layer of phosphor sandwiched between a pair of conducting electrodes at least one of which is transparent to allow the visible light produced by the phosphor to escape. The lamps are energized by the application of an alternating voltage across the electrodes. As is well known, one of the most serious problems with electroluminescent lamps is the rapid deterioration or loss of brightness during operation and especially under conditions of high humidity.

The depreciation of electroluminescent phosphors may be classified into two types:

(1) dry depreciation, or depreciation in a comparatively water-free environment; and (2) wet depreciation, or depreciation which is facilitated by the presence of water.

The latter type of depreciation is generally at least ten times as fast as the former and is the type that predominates in plastic encapsulated electroluminescent lamps (except possibly during the dry winter months). It is possible, however, that dry depreciation and wet depreciation are both due to the same fundamental causes, and that there is not so much a difference in kind as in degree, the wet depreciation then being basically the same as dry depreciation but accelerated by the presence of larger amounts of water. There are also indications that some traces of water remain in so-called dry electroluminescent lamps even after the use of the utmost refinements in technique for removing all humidity. The phosphor treatment of our invention was developed primarily to decrease wet depreciation, but as will be shown, it is also very effective in decreasing so-called dry depreciation.

The objects of the invention are to provide electroluminescent phosphors having improved maintenance characteristics and suitable treatments for achieving these characteristics.

Figure 1:
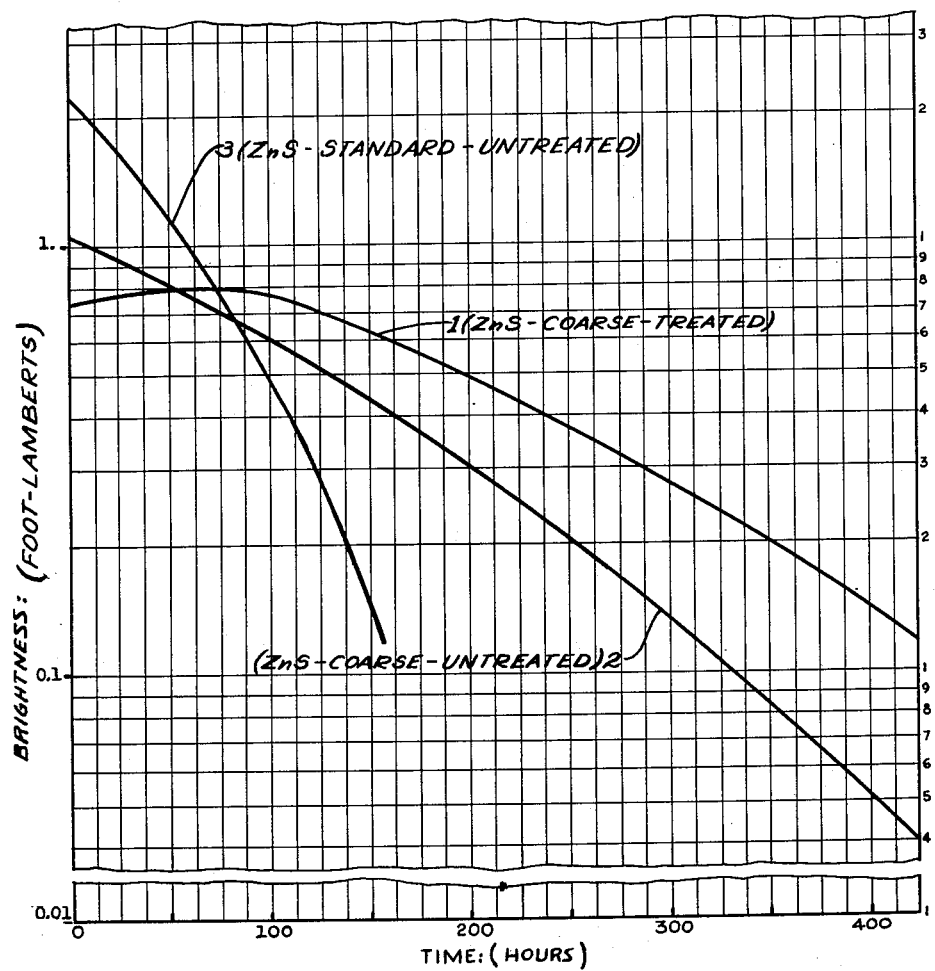
Figure 2:
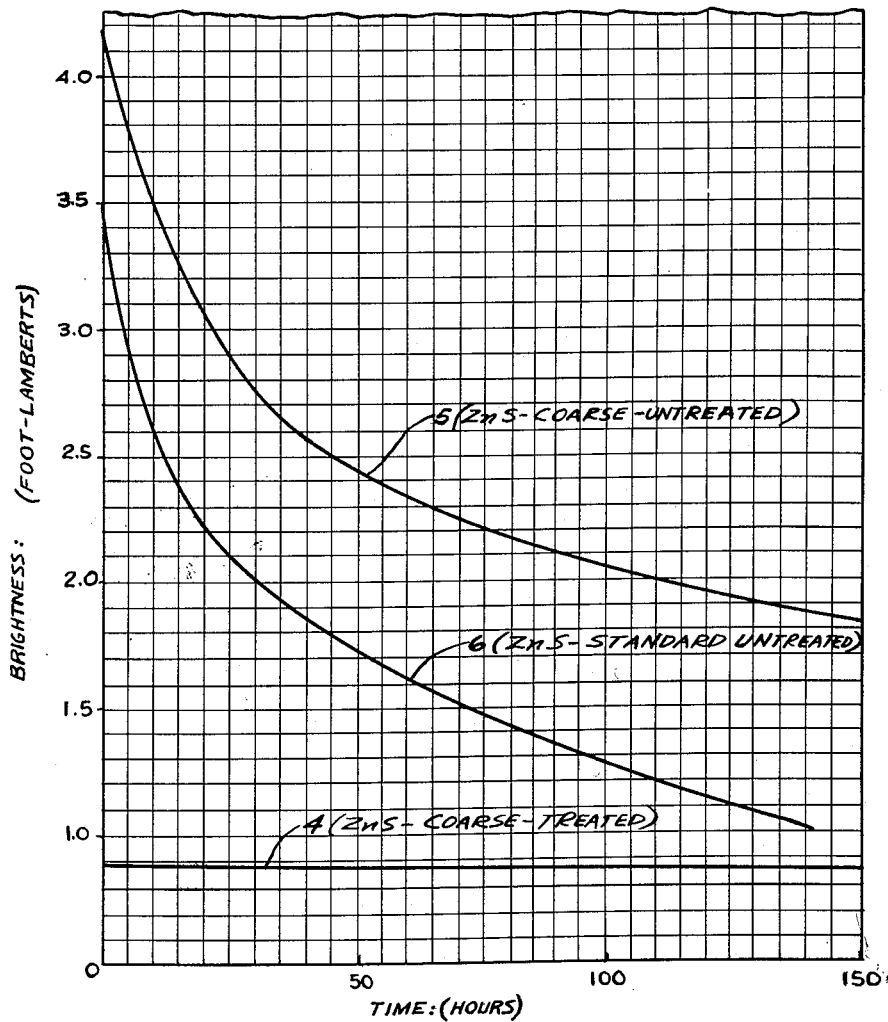

In the drawings, FIGS. 1 and 2 graphically compare performance characteristics of phosphors treated in accordance with the invention with other phosphors not so treated.

We have conceived a working hypothesis of the mechanism of wet electroluminescent depreciation of phosphors such as zinc sulfide which has led directly to the making of the present invention. We realize of course that there are other theories of merit and obviously our invention is valuable by reason of the results irrespectively of the theory by which they are explained. However an explanation of our working hypothesis will facilitate understanding of the invention and of the guiding principles to be followed in its application.

Taking zinc sulfide as an example, wet electroluminescent depreciation leads to actual decomposition of zinc sulfide into free zinc, sulphur and possibly other products. The reactions taking place are the following:

$$ZnS + \text{adsorbed } H_2O \rightarrow Zn^{++} + S^{=}$$
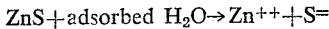
$$2e^- + Zn^{++} \rightarrow Zn\downarrow$$
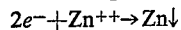
$$2e^+ + S^= \rightarrow S\downarrow$$
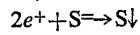

The above reactions obviously take place only at the surface of the zinc sulfide crystallites. We postulate that the completion of the reaction is due to the presence of electrons and holes (vacant electron sites) which have migrated from regions of the crystallite below the surface which are excited in the electroluminescent process. If the electrons and holes could be prevented from migrating to the surface of the crystallite, the decomposition of zinc sulfide at the surface could then be stopped. We have determined that this can in fact be done using nickel, iron or cobalt to provide the recombination centers. The method of providing these centers near the surface involves firing the phosphor with a suitable salt of the selected metal at a relatively low temperature for a short time. The treated phosphors show some loss in initial brightness but a very decided improvement in maintenance, that is in resistance to water depreciation. The half-lives of the treated phosphors were doubled by comparison with the half-lives of the best untreated phosphors available from the standpoint of maintenance.

It is desired to emphasize that the invention provides a high concentration of Ni, Fe and Co recombination centers in surface layers only of the phosphor crystallites such as the zinc sulfide, and not throughout the mass of the crystallite. Nickel and similar materials are basically "killers" of luminescence and when allowed to diffuse in sufficient quantity throughout the body of the crystallite, will completely destroy the luminescence. Even when incorporated into a phosphor according to the invention, nickel retains its characteristics as a "killer" and does actually destroy the luminescence in the surface layers of the phosphor crystallites. By restricting the diffusion of nickel to the surface layers, the luminescence in the core or central body of the crystallite remains unaffected. At the same time the surface layers which are no longer luminescent due to the high concentration of recombination centers serve as a protective shell for the central mass of the phosphor. This results of course from the absence or near absence of electrons and holes in the surface layers as a result of which the decomposition of, say, zinc sulfide into free zinc and sulphur is stopped.

It will be appreciated from the foregoing that the provision of Ni, Fe or Co recombination centers in a phosphor crystallite in accordance with the invention is completely different in purpose and principle, and likewise in manner of formation and mode of occurrence, from the additions of Ni, Fe and Co to electroluminescent phosphors which have been proposed heretofore. Our own experience has been that the firing of nickel etc. into zinc sulfide in concentrations of the order of $10^{-2}$ to $10^{-5}$ gram atoms of nickel etc. per mole of ZnS at high temperatures such as 1,000° C. greatly reduces the luminescence of the phosphor and this is particularly so where the phosphor is in a finely powdered form.

We prefer to diffuse into the surface layers of the zinc sulfide the highest concentration of nickel etc. which the crystal lattice of the phosphor will accommodate. This concentration is not accurately known; however, our experiments have shown that adding $10^{-2}$ to $10^{-5}$ gram atoms of nickel etc. per mole of zinc sulfide, and firing the phosphor under conditions such that the nickel etc. diffuses only into the surface layers of the phosphor particle, produces the improvement in maintenance sought after without prohibitive loss in brightness. Under such firing conditions the actual surface concentration of nickel etc. may, of course, be considerably higher than the above specified range. In general we prefer to use a concentration of nickel in the range of $10^{-3}$ to $10^{-4}$ gram atoms per mole of ZnS.

Since the invention is predicated on the dissolving of nickel etc. in the surface layers of the phosphor, it is to be expected that the treatment will result in less loss of brightness for large particle size phosphors than for small particle size phosphors and this has in fact been found to be the case. An example of a fine phosphor is that commonly known as standard green electroluminescent phosphor which may be prepared by firing a mixture of 75% ZnS and 25% ZnO activated with copper and coactivated with chlorine at 900° C. in covered crucibles in air. After cooling the phosphor is washed in dilute acid and dilute cyanide solution to remove free zinc oxide and superficial copper compounds. An example of a coarse electroluminescent phosphor is described in copending application Serial No. 729,227 filed April 18, 1958, of Manuel Aven entitled "Electroluminescent Green Zinc Sulfide Phosphor" and assigned to the same assignee as the present invention. Briefly this phosphor is prepared by prefiring the pure zinc sulfide, zinc oxide mixture at a temperature above the hexagonal-cubic transition point, thereafter adding the copper activator and chlorine coactivator, and refiring at a temperature below the hexagonal-cubic transition point and in the range of 850 to 950° C. This phosphor is likewise washed in dilute acid and dilute cyanide solution. Other coactivators such as manganese may be used and the treatment according to the invention provides similar improvements in maintenance characteristics.

The following are examples of phosphors treated in accordance with the invention to improve the maintenance characteristic.

*Example 1—Nickel*

97.5 grams (one mole) of ZnS:Cu,Cl coarse green electroluminescent phosphor, prepared as per the aforementioned Aven application, are wetted down with 100 milliliters of $Ni(NO_3)_2$ solution containing $10^{-5}$ gram atoms of nickel per milliliter. The slurry is dried in an oven and then fired at 500° C. in a nitrogen atmosphere for 15 minutes.

This treated phosphor, along with other phosphors for purposes of comparison, was then tested by incorporating it into plastic encapsulated electroluminescent lamps of the kind described in copending application Serial No. 701,906 of Elmer G. Fridrich and Paul A. Dell, filed December 10, 1957, entitled "Electroluminescent Lamp and Manufacture Thereof" and assigned to the same assignee as the present invention. The phosphor was dispersed in a layer of polystyrene over an insulating layer of barium titanate in cyanoethyl cellulose coated on an aluminum foil. The coated foil was overlaid with a sheet of conducting glass paper and encapsulated in a thin polyethylene envelope evacuated and heat-sealed around its edges.

Similarly constructed lamps differing only in respect of the phosphor were tested for resistance to wet depreciation by operating them continuously at 120 volts, 60 cycles per second in an enclosure maintained at 85% relative humidity and approximately 75° F. The comparative results for the various phosphors tested are shown in FIG. 1 wherein the brightness in foot-lamberts is plotted as ordinate on a logarithmic scale while the time of operation in hours is plotted as abscissa on a linear scale. Curve 1 illustrates the maintenance of the coarse green electroluminescent phosphor treated in accordance with the invention as per Example 1. It will be observed that the half-life, that is the time required for the brightness to depreciate to half the original brightness is 250 hours. Curve 2 illustrates the maintenance of the coarse green electroluminescent phosphor without the treatment according to the invention; the initial brightness is higher than that of the treated phosphor but drops below it in 54 hours and the half-life is only 125 hours. Curve 3 shows the maintenance of standard green (fine) electroluminescent phosphor without any treatment; whereas the initial brightness is substantially higher, the depreciation is extremely rapid and the half-life is only 90 hours.

In order to compare the dry maintenance characteristic of the same three phosphors, accelerated tests were performed on dispersions of the phosphors in dry chlorinated binphenyl (Aroclor, described in publication O-P-115 of Monsanto Chemical Co.). Samples of the phosphor suspensions were placed between a metal electrode and a conducting glass plate at a spacing of .005 inch and operated at 300 volts, 500 cycles per second. Comparative results for the first 150 hours are shown in FIG. 2: curve 4 for the coarse green electroluminescent phosphor treated in accordance with the invention (Example 1); curve 5 for a coarse green electroluminescent phosphor untreated, and curve 6 for a standard green (fine) untreated phosphor. It will be observed that the slope of the curve which is indicative of dry depreciation is least for the treated phosphor and greatest for the standard green untreated phosphor. After 900 hours (not shown by the curves) the percent maintenance of the treated phosphor was still over 60%.

*Example 2—Iron*

97.5 grams (one mole) of ZnS:Cu,Cl coarse green electroluminescent phosphor are wetted down with 100 milliliters of $FeSO_4$ containing $10^{-5}$ gram atoms Fe per milliliter. The slurry is dried in an oven and then fired at 600° C. in an atmosphere of nitrogen for 15 minutes.

The phosphor was tested for wet maintenance by incorporating it into a plastic encapsulated cell as previously described and operating the cell at 120 volts, 60 cycles per second in an enclosure maintained at 85% relative humidity and approximately 75° F. The half-life was determined to be 210 hours.

*Example 3—Cobalt*

97.5 grams (one mole) of ZnS:Cu,Cl coarse green electroluminescent phosphor are wetted down with 100 milliliters of cobalt nitrate $Co(NO_3)_2$ containing $10^{-5}$ gram atoms of cobalt per milliliter. The slurry is dried in an oven and fired at 500° C. for 15 minutes in an atmosphere of nitrogen.

The phosphor was tested for wet maintenance by incorporating it into a plastic encapsulated cell as previously described and found to give a half-life of 165 hours.

It is important to note that the nickel etc. must not penetrate too deeply into the phosphor crystallites. If the firing time is extended to an hour or so, the loss in initial brightness is much greater. Conversely for a given firing time, higher firing temperatures will give greater losses in initial brightness. Loss of brightness depends upon the depth of diffusion of the nickel etc. into the phosphor crystallites and the depth of diffusion depends on both time and temperature. Within limits, the same results may be achieved from keeping the time constant and increasing the temperature as from keeping the temperature constant and lengthening the time. This is illustrated in the following table of results of accelerated wet depreciation tests of the phosphor in chlorinated biphenyl (Aroclor) to which water was intentionally added:

| Firing Temperature | Brightness (Arbitrary Units) | Percent of Initial Brightness After 30 Minutes |
|---|---|---|
| No treatment (Control) | .58 | 52 |
| 350° C | .33 | 79 |
| 400° C | .20 | 87 |
| 500° C | .16 | 96 |
| 600° C | .06 | 99 |

In general we prefer a temperature in the range from 350° C. to 600° C. correlated with a treatment time providing an initial brightness in the treated phosphor not less than 10% of the initial brightness of the same phosphor without treatment.

The specific examples of embodiments of the invention given herein are intended as illustrative and not as limitative of the invention whose scope is to be determined by the appended claims.

What we claim as new and desire to secure by Letters Patent of the United States is:

1. An electroluminescent phosphor having improved maintenance characteristics consisting essentially of activated zinc sulfide crystallites whereof the surface layers only have diffused thereinto a high concentration of metal from the group consisting of nickel, iron and cobalt, the depth of diffusion of said metal into said surface layers being limited to retain an initial brightness not less than 10% of the initial brightness in the absence of said metal.

2. An electroluminescent phosphor having improved maintenance characteristics consisting essentially of zinc sulfide crystallites activated with copper and chlorine whereof the surface layers only have diffused thereinto a high concentration of metal from the group consisting of nickel, iron and cobalt, the depth of diffusion of said metal into said surface layers being limited to retain an initial brightness not less than 10% of the initial brightness in the absence of said metal.

3. An electroluminescent phosphor having improved maintenance characteristics consisting essentially of activated zinc sulfide crystallites having diffused thereinto a metal from the group consisting of nickel, iron and cobalt in a concentration between $10^{-2}$ and $10^{-5}$ gram atoms of the metal per mole of zinc sulfide, said metal being restricted in its depth of diffusion to the surface layers of said crystallites whereby to retain in said phosphor an initial brightness not less than 10% of the initial brightness in the absence of said metal.

4. An electroluminescent phosphor having improved maintenance characteristics consisting essentially of zinc sulfide crystallites activated with copper and chlorine having diffused thereinto a metal from the group consisting of nickel, iron and cobalt in a concentration between $10^{-2}$ and $10^{-5}$ gram atoms of the metal per mole of zinc sulfide, said metal being restricted in its depth of diffusion to the surface layers of said crystallites whereby to retain in said phosphor an initial brightness not less than 10% of the initial brightness in the absence of said metal.

5. An electroluminiscent phosphor having improved maintenance characteristics consisting essentially of crystallites of zinc sulfide activated with copper to provide an electroluminescent core, said crystallites having diffused thereinto a metal from the group consisting of nickel, iron and cobalt in a concentration between $10^{-3}$ and $10^{-4}$ gram atoms of the metal per mole of zinc sulfide, said metal being restricted in its depth of diffusion substantially to the surface layers of said crystallites, the depth of diffusion being limited to retain in said phosphor an initial brightness not less than 10% of the initial brightness in the absence of said metal.

6. The method of treating an electroluminescent phosphor of zinc sulfide crystallites to provide improved maintenance characteristics comprising heating the crystallites to a temperature not exceeding 600° C. with salts from the group consisting of nickel, iron and cobalt for a time not exceeding approximately 15 minutes and correlated to said temperature to provide substantial diffusion of said metal into the surface layers only of said crystallites whereby to retain in said phosphor an initial brightness not less than 10% of the initial brightness in the absence of the treatment herein.

7. The method of treating an electroluminescent phosphor of zinc sulfide crystallites to provide improved maintenance characteristics comprising heating the crystallites to the temperature range of 350° C. to 600° C. with salts of metal from the group consisting of nickel, iron and cobalt for a time not exceeding approximately 15 minutes and correlated to the temperature selected within said range in order to restrict the depth of diffusion of said metal into the surface layers only of said crystallites whereby to retain in the treated phosphor an initial brightness not less than 10% of the initial brightness in the absence of the treatment herein.

References Cited in the file of this patent

UNITED STATES PATENTS

| | | |
|---|---|---|
| 2,774,902 | Burns | Dec. 18, 1956 |

FOREIGN PATENTS

| | | |
|---|---|---|
| 18,260 | Australia | July 3, 1934 |
| 153,571 | Australia | Oct. 9, 1953 |

OTHER REFERENCES

Lehmann: Physical Review, vol. 101, No. 1, pp. 489–491 (Jan. 1, 1956).

Hill-Jour. of Elect. Chem. Soc., vol. 96, No. 5, pp. 275–286, Nov. 1949.

Hoogenstraaten: Jour. of Elect. Chem. Soc., pp. 356–365, vol. 100, No. 8 (Aug. 1953), pp. 366–375.